US012785541B2

(12) United States Patent
Barbieri et al.

(10) Patent No.: US 12,785,541 B2
(45) Date of Patent: Nov. 3, 2026

(54) CONTROL MODULE AND METHOD FOR A DC-DC SWITCHING CONVERTER WITH A SINGLE INDUCTOR AND AT LEAST TWO OUTPUTS

(71) Applicant: STMicroelectronics International N.V., Geneva (CH)

(72) Inventors: Andrea Barbieri, Casalpusterlengo (IT); Raffaele Enrico Furceri, Legnano (IT); Aldo Vidoni, Rho (IT); Mattia Bonini, Ripalta Cremasca (IT)

(73) Assignee: STMicroelectronics International N.V., Geneva (CH)

( * ) Notice: Subject to any disclaimer, the term of this patent is extended or adjusted under 35 U.S.C. 154(b) by 156 days.

(21) Appl. No.: 18/944,560

(22) Filed: Nov. 12, 2024

(65) Prior Publication Data

US 2025/0167682 A1 May 22, 2025

(30) Foreign Application Priority Data

Nov. 16, 2023 (IT) ........................ 102023000024336

(51) Int. Cl.
*H02M 1/00* (2006.01)
*H02M 3/158* (2006.01)

(52) U.S. Cl.
CPC ......... *H02M 1/009* (2021.05); *H02M 3/1582* (2013.01); *G05B 2219/41406* (2013.01)

(58) Field of Classification Search
CPC ................ H02M 1/009; H02M 3/1582; G05B 2219/41406
See application file for complete search history.

(56) References Cited

U.S. PATENT DOCUMENTS

2011/0068757 A1 3/2011 Xu et al.
2012/0062030 A1* 3/2012 Xu ...................... H02M 3/1582 307/31

(Continued)

FOREIGN PATENT DOCUMENTS

EP 3748833 A1 12/2020

OTHER PUBLICATIONS

IT Search Report and Written Opinion for priority application, IT Appl. No. 102023000024336, report dated May 23, 2024, 8 pgs.

(Continued)

*Primary Examiner* — Harry R Behm
(74) *Attorney, Agent, or Firm* — Crowe & Dunlevy LLC

(57) ABSTRACT

A DC-DC switching converter includes an electrical network with an inductor, switches and first and second capacitors subject to first and second voltages. A control module generates first and second control signals to control the switches with a sequence of switching periods implementing, for each switching period, a phase succession including: an inductor charge phase having a first duration as a function of the first control signal; a first inductor discharge phase towards the first capacitor having a second duration as a function of the second control signal; and a second inductor discharge phase towards the second capacitor. The control module couples to the electrical network to form a signal vector including signals indicative of the first and second voltages and the current. A gain stage generates the first and second control signals by multiplying the signal vector by a gain matrix for the control module forming a linear-quadratic regulator.

13 Claims, 4 Drawing Sheets

(56) References Cited

U.S. PATENT DOCUMENTS

| | | | | |
|---|---|---|---|---|
| 2017/0194854 | A1* | 7/2017 | Cherkassky | H02M 3/1582 |
| 2019/0199215 | A1 | 6/2019 | Zhao et al. | |
| 2020/0304020 | A1* | 9/2020 | Lu | H02M 3/155 |
| 2021/0391792 | A1* | 12/2021 | Burkhart | H02M 3/1584 |
| 2021/0408908 | A1* | 12/2021 | Lu | H02M 3/158 |

OTHER PUBLICATIONS

Wikipedia: "Linear-Quadratic Regulator," Nov. 1, 2023, XP93166060, 7 pgs.

Renesas: "ISL97901," Jun. 29, 2012, XP093166130, 3 pgs.

* cited by examiner

CONTROL MODULE AND METHOD FOR A DC-DC SWITCHING CONVERTER WITH A SINGLE INDUCTOR AND AT LEAST TWO OUTPUTS

PRIORITY CLAIM

This application claims the priority benefit of Italian Application for Patent No. 102023000024336, filed on Nov. 16, 2023, the content of which is hereby incorporated by reference in its entirety to the maximum extent allowable by law.

TECHNICAL FIELD

The present invention relates to a control module for a DC-DC switching converter with a single inductor and double output. The present invention further relates to a control method for a DC-DC switching converter with a single inductor and double output.

BACKGROUND

As is known, nowadays so-called DC-DC switching converters are used in numerous fields of application.

For example, using DC-DC switching converters is known to power the laser diodes of a projective optical system. In this regard, typically a projective optical system comprises three laser diodes, which are configured to emit red, green and blue radiation, respectively.

Furthermore, typically the two laser diodes that emit in green and blue are powered respectively by a first DC-DC switching converter, of "boost"-type, while the laser diode that emits in red is powered respectively by a second DC-DC switching converter, of "buck-boost"-type. In practice, the first and second DC-DC switching converters are independent of each other, however this entails high area consumption and the duplication, inter alia, of the inductors; furthermore, consumption is not optimized due to the independence of the first and second DC-DC switching converters.

Solutions are also known which provide for powering two loads by using a single inductor, as described for example in European Patent Application No. 3748833 (incorporated herein by reference). In this solution, two independent control loops are formed, which control the charge of the inductor and the voltages on the loads, respectively. In practice, a first control loop controls the energy transfer from the source to the inductor, while a second control loop controls the energy transfer from the inductor to the loads. However, the second control loop comprises threshold comparators and implements time-averaging techniques, therefore it is significantly slower than the first control loop; consequently, control is slow overall.

Furthermore, any increase in the speed of the control would require making the second control loop as fast as the first control loop, but this would cause a coupling of the first and second control loops, with a consequent risk of instability. In addition, the solution proposed in European Patent Application No. 3748833 requires the presence of a time base having a higher frequency than the switching frequency, with a consequent further increase in circuit complexity and consumption.

There is a need in the art to provide a control module for a DC-DC switching converter of the single-inductor and double-output type, which at least partially overcomes the drawbacks of the prior art.

SUMMARY

According to the present invention, a control module for a DC-DC switching converter and a control method of a DC-DC switching converter are provided.

In an embodiment, a DC-DC switching converter comprises an electrical network configured to couple to a source generator and including an inductor, a plurality of electronically controllable switches and a first and a second output capacitor, which, in use, are subject to a first and a second output voltage respectively. A control module for the DC-DC switching converter is configured to generate a first and a second control signal, the control module is further configured to control the switches so as to implement a sequence of switching periods and to implement, for each switching period, a phase succession. This phase succession comprises: a charge phase of the inductor, wherein the inductor is coupled to the source generator and is flown through by a current, which increases over time, said charge phase of the inductor having a first duration, which is a function of the first control signal; a first discharge phase of the inductor, wherein the inductor is coupled to the first output capacitor such that the current discharges towards the first output capacitor, said first discharge phase of the inductor having a second duration, which is a function of the second control signal; and a second discharge phase of the inductor, wherein the inductor is coupled to the second output capacitor such that the current discharges towards the second output capacitor. The control module is further configured to couple to the electrical network so as to form a signal vector including at least a first, a second and a third input signal, which are indicative respectively of the first and second output voltages and of said current. The control module further comprises a gain stage configured to generate the first and second control signals by multiplying the signal vector by a gain matrix, the gain matrix being such that the control module forms a linear-quadratic regulator.

In an embodiment, a DC-DC switching converter comprises the control module according to foregoing description and said electrical network.

In an embodiment, a system comprises the DC-DC switching converter according to foregoing description and: a first and a second light diode configured to emit light radiation at different wavelengths and electrically coupled to the first and, respectively, the second output capacitors; and a first and a second current regulator, which are controllable so as to regulate the currents that flow in the first and second light diodes, respectively.

In an embodiment, a method is provided for controlling a DC-DC switching converter. The DC-DC switching converter comprises an electrical network configured to couple to a source generator and including an inductor, a plurality of electronically controllable switches and a first and a second output capacitor, which, in use, are subject to a first and a second output voltage respectively. The method comprises: generating a first and a second control signal; controlling the switches so as to implement a sequence of switching periods; and implementing, for each switching period, a phase succession. The phase succession comprises: a charge phase of the inductor, wherein the inductor is coupled to the source generator and is flown through by a current, which increases over time, said charge phase of the inductor having a first duration, which is a function of the first control signal; a first discharge phase of the inductor, wherein the inductor is coupled to the first output capacitor such that the current discharges towards the first output capacitor, said first discharge phase of the inductor having a second duration, which is a function of the second control signal; and a second discharge phase of the inductor, wherein the inductor is coupled to the second output capacitor such that the current discharges towards the second output capacitor. The method further comprises: forming a signal vector including at least a first, a second and a third input signal, which are indicative respectively of the first and second output voltages and of said current; and generating the first and second control signals by multiplying the signal vector by a gain matrix, the gain matrix being such that the control module forms a linear-quadratic regulator.

BRIEF DESCRIPTION OF THE DRAWINGS

For a better understanding of the present invention, embodiments thereof are now described, purely by way of non-limiting example, with reference to the attached drawings, wherein.

DETAILED DESCRIPTION

Figure 1:
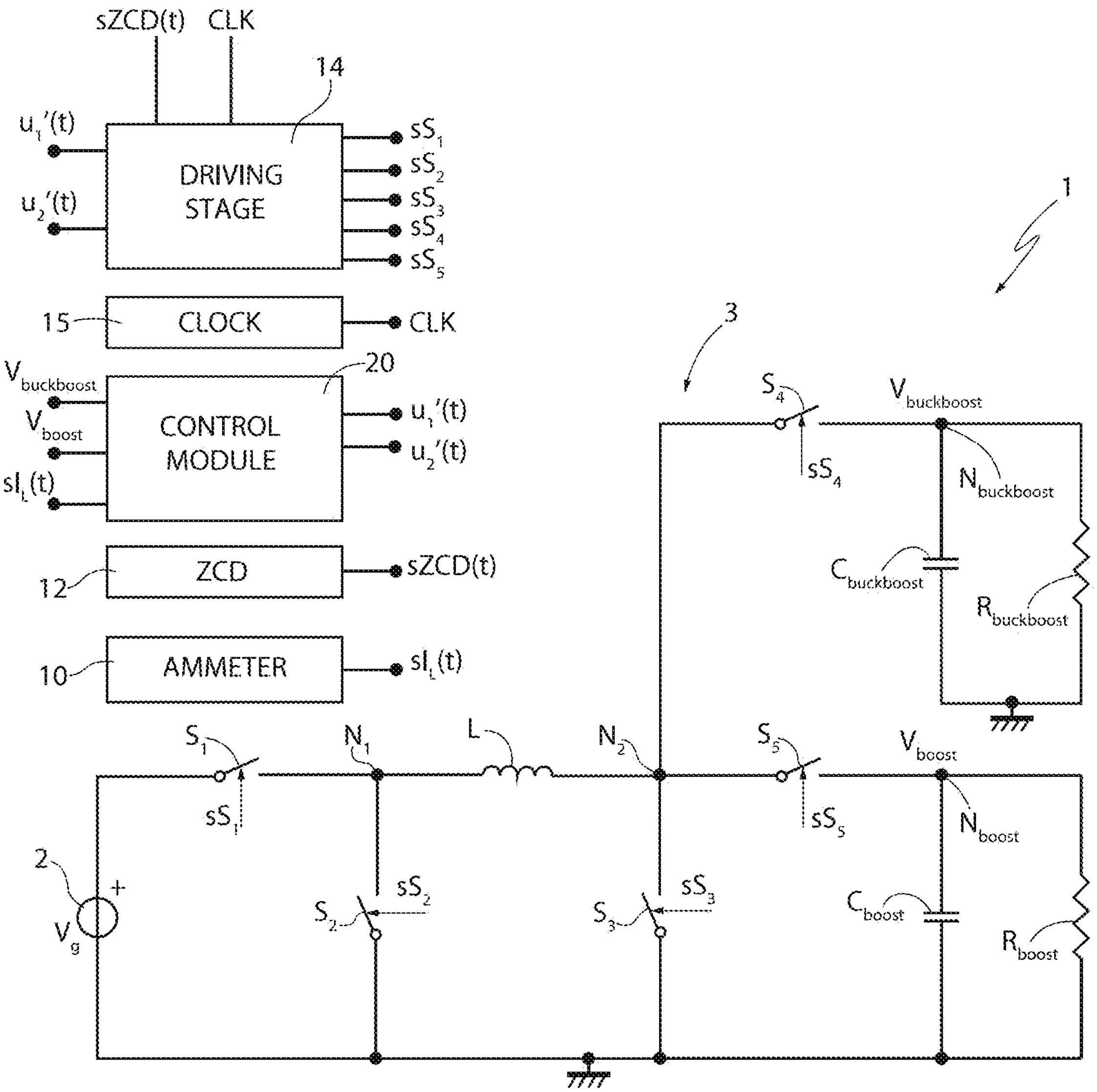
FIG. 1 shows a circuit diagram of a DC-DC converter with a single inductor and double output.

FIG. 1 shows a DC-DC switching converter 1 of the single-inductor and double-output type, which is hereinafter referred to as switching converter 1. The switching converter 1 is coupled to a source 2, which generates an input voltage $V_g$ of the continuous type, and to a first and a second load, which are represented by a first resistor $R_{boost}$ and a second resistor $R_{buckboost}$, respectively, which are connected to a first and a second output node $N_{boost}$, $N_{buckboost}$, respectively.

In detail, the switching converter 1 comprises an switched inductive electrical network 3, which comprises first, second, third, fourth and fifth switches $S_1$, $S_2$, $S_3$, $S_4$, $S_5$ (formed for example by corresponding MOSFET transistors), an inductor L and first and second output capacitors $C_{boost}$, $C_{buckboost}$.

A first conduction terminal of the first switch $S_1$ is connected to the source 2, so as to receive the input voltage $V_g$. A second conduction terminal of the first switch $S_1$ is connected to a first terminal of the inductor L, so as to form a first internal node $N_1$. A first and a second conduction terminal of the second switch $S_2$ are connected to the first internal node $N_1$ and to ground, respectively.

A first conduction terminal of the third switch $S_3$ is connected to a second terminal of the inductor L, so as to form a second internal node $N_2$. A second conduction terminal of the third switch $S_3$ is connected to ground.

A first and a second conduction terminal of the fourth switch $S_4$ are connected to the second internal node $N_2$ and to a first terminal of the second resistor $R_{buckboost}$, respectively, so as to form the second output node $N_{buckboost}$. A second terminal of the second resistor $R_{buckboost}$ is connected to ground. A first and a second terminal of the second output capacitor $C_{buckboost}$ are connected to the second output node $N_{buckboost}$ and to ground, respectively.

A first and a second conduction terminal of the fifth switch $S_5$ are connected to the second internal node $N_2$ and to a first terminal of the first resistor $R_{boost}$, respectively, so as to form the first output node $N_{boost}$. A second terminal of the first resistor $R_{boost}$ is connected to ground. A first and a second terminal of the first output capacitor $C_{boost}$ are connected to the first output node $N_{boost}$ and to ground, respectively.

Hereinafter reference is made to the voltages present on the first and second output nodes $N_{boost}$, $N_{buckboost}$ as to the first and second output voltages $V_{boost}$, $V_{buckboost}$, respectively. The first and second output voltages $V_{boost}$, $V_{buckboost}$ are generated by the switching converter 1 starting from the input voltage $V_g$, as described in more detail below.

As shown qualitatively in FIG. 1, the switching converter 1 also comprises an ammeter 10 configured to generate a signal $sI_L(t)$ of continuous-time type, indicative of the value of the current that flows into the inductor L; for example, the signal $sI_L(t)$ is a voltage signal. Hereinafter, the current that flows into the inductor L is referred to as the current $I_L$. The ammeter 10 is of a per se known type and, although not shown, is electrically coupled to the inductor L in a per se known manner.

The switching converter 1 also comprises a zero-crossing detection circuit 12, which generates a signal sZCD(t) of continuous-time type, which is indicative of any sign inversions of the current $I_L$. The zero-crossing detection circuit 12 is of a per se known type and, although not shown, is electrically coupled to the inductor L in a per se known manner.

The switching converter 1 further comprises a driving stage 14, a clock circuit 15 and a control module 20.

In detail, the clock circuit 15 generates a clock signal CLK, which has a frequency equal to the switching frequency $f_{SW}$.

The control module 20 receives the signal $sI_L(t)$ and the first and second output voltages $V_{boost}$, $V_{buckboost}$ and generates, as described in detail below, first and second intermediate signals $u_1'(t)$, $u_2'(t)$.

The driving stage 14 implements, for example, a configurable combinatorial function which receives the first and second intermediate signals $u_1'(t)$, $u_2'(t)$, the clock signal CLK and the signal sZCD(t) and generates first, second, third, fourth and fifth switch control signals $sS_1$, $sS_2$, $sS_3$, $sS_4$, $sS_5$, which control the first, second, third, fourth and fifth switches $S_1$, $S_2$, $S_3$, $S_4$, $S_5$, respectively.

In more detail, the switching converter 1 may operate in a continuous-current mode (CCM) or in a discontinuous-current mode (DCM).

Figure 2A:
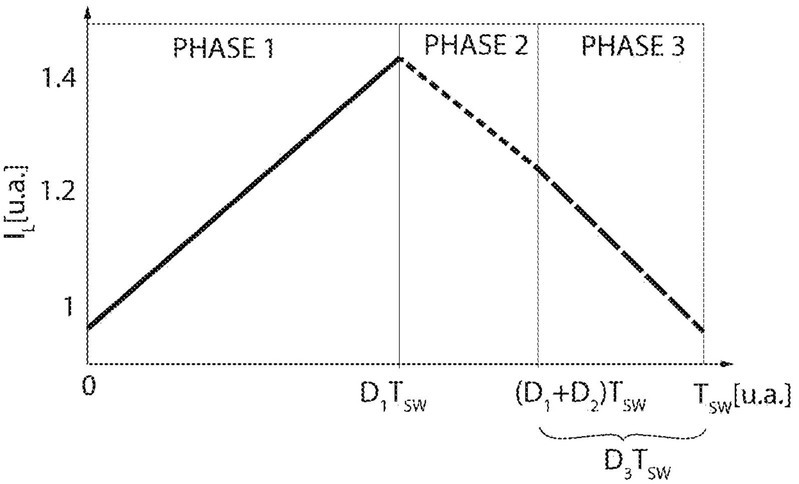
FIGS. 2A and 2B show trends over time of a current, during a switching period.

In particular, when the switching converter 1 operates in the continuous-current mode, the driving stage 14 generates the first, the second, the third, the fourth and the fifth switch control signals $sS_1$, $sS_2$, $sS_3$, $sS_4$, $sS_5$ so that, in each switching period (which has duration $T_{SW}=1/f_{SW}$), the switching converter 1 performs a phase succession formed by a first phase, a second phase and a third phase, as shown in FIG. 2A.

In detail, in the first phase, the first and third switches $S_1$, $S_3$ are closed, while the second, fourth and fifth switches $S_2$, $S_4$, $S_5$ are open. Consequently, a so-called charging of the inductor L occurs, since, while the switching converter 1 operates in the first phase, the current $I_L$ increases linearly over time, with a slope approximately equal to $V_g/L$; the first and second output nodes $N_{boost}$, $N_{buckboost}$ are decoupled from the inductor L, which is coupled to the source 2. In more detail, the switching converter 1 operates in the first phase for a time period equal to $D_1*T_{SW}$, wherein $D_1$ is comprised between zero and one.

In the second phase, the first and fifth switches $S_1$, $S_5$ are closed, while the second, third and fourth switches $S_2$, $S_3$, $S_4$ are open. Consequently, the first output node $N_{boost}$ is coupled to the inductor L; furthermore, a so-called discharging of the inductor L occurs, since the current $I_L$ decreases linearly over time, with a slope approximately equal (at steady state) to $(V_g-V_{boost})/L$. In practice, the current $I_L$ discharges towards the first output capacitor $C_{boost}$ and an energy transfer to the first load occurs. Furthermore, the switching converter 1 operates in the second phase for a time period equal to $D_2*T_{SW}$, wherein $D_2$ is comprised between zero and one.

In the third phase, the second and fourth switches $S_2$, $S_4$ are closed, while the first, third and fifth switches $S_1$, $S_3$, $S_5$ are open. Consequently, the second output node $N_{buckboost}$ is coupled to the inductor L. A further discharging of the inductor L occurs, since the current $I_L$ decreases linearly over time, with a slope approximately equal to $(-V_{buckboost})/L$. In practice, the current $I_L$ discharges towards the second output capacitor $C_{buckboost}$ and an energy transfer to the second load occurs. Furthermore, the switching converter 1 operates in the third phase for a time period equal to $D_3*T_{SW}$, wherein $D_3$ is equal to $1-D_1-D_2$.

Figure 2B:
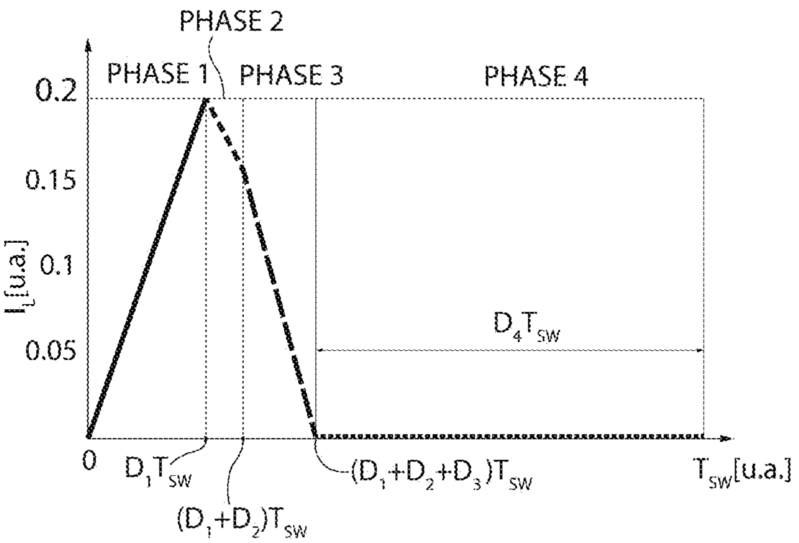

When the switching converter 1 operates in the discontinuous-current mode, the driving stage 14 generates the first, second, third, fourth and fifth switch control signals $sS_1$, $sS_2$, $sS_3$, $sS_4$, $sS_5$ so that, in each switching period, the switching converter 1 performs a phase succession formed by the first, second and third phases and also by a fourth phase, as shown in FIG. 2B, wherein the durations of the first, second and third phases are still equal to $D_1*T_{SW}$, $D_2*T_{SW}$ and $D_3*T_{SW}$.

In the fourth phase, the second and third switches $S_2$, $S_3$ are closed, while the first, fourth and fifth switches $S_1$, $S_4$, $S_5$ are open. Consequently, the fourth phase is a "free-wheeling" phase and the current $I_L$ is zero. Furthermore, the switching converter 1 operates in the fourth phase for a time period equal to $D_4*T_{SW}$, wherein $D_4$ is equal to $1-D_1-D_2-D_3$.

In practice, both when the switching converter 1 operates in the continuous-current mode and when the switching converter 1 operates in the discontinuous-current mode, the behavior of the switching converter 1 is completely determined by the durations $D_1$, $D_2$ of the first and second phases; in other words, the durations $D_1$, $D_2$ represent control parameters (equivalently, the degrees of freedom of the control) of the behavior of the switching converter 1. Conversely, the durations $D_3$, $D_4$ of the third and fourth phases depend, as previously mentioned, on the durations $D_1$, $D_2$ of the first and second phases.

In particular, as regards the continuous-current mode, sending the signal sZCD(t) to the driving stage 14 may be omitted, since the driving stage 14 may generate the first, second, third, fourth and fifth switch control signals $sS_1$, $sS_2$, $sS_3$, $sS_4$, $sS_5$ so as to implement the phase succession shown in FIG. 2A, where the durations $D_1$ and $D_2$ are a function of the first and second intermediate signals $u_1'(t)$, $u_2'(t)$, respectively, as explained in more detail below, and also $D_3=1-D_1-D_2$, as previously explained. Furthermore, as regards the discontinuous-current mode, the driving stage 14 may generate the first, second, third, fourth and fifth switch control signals $sS_1$, $sS_2$, $sS_3$, $sS_4$, $sS_5$ so as to implement the phase succession shown in FIG. 2B, where the durations $D_1$ and $D_2$ are a function of the first and second intermediate signals $u_1'(t)$, $u_2'(t)$, respectively, as explained in more detail below, and also the third phase extends between the end of the second phase and the instant wherein the current $I_L(t)$ cancels out, signaled by the signal sZCD(t). Furthermore, the beginning and the end of the fourth phase are set on the basis of the signal sZCD(t), which indicates the cancellation of the current $I_L(t)$, and the clock signal CLK, which indicates the beginning and the end of each switching period, such that $D_4=1-D_1-D_2-D_3$.

Figure 3:
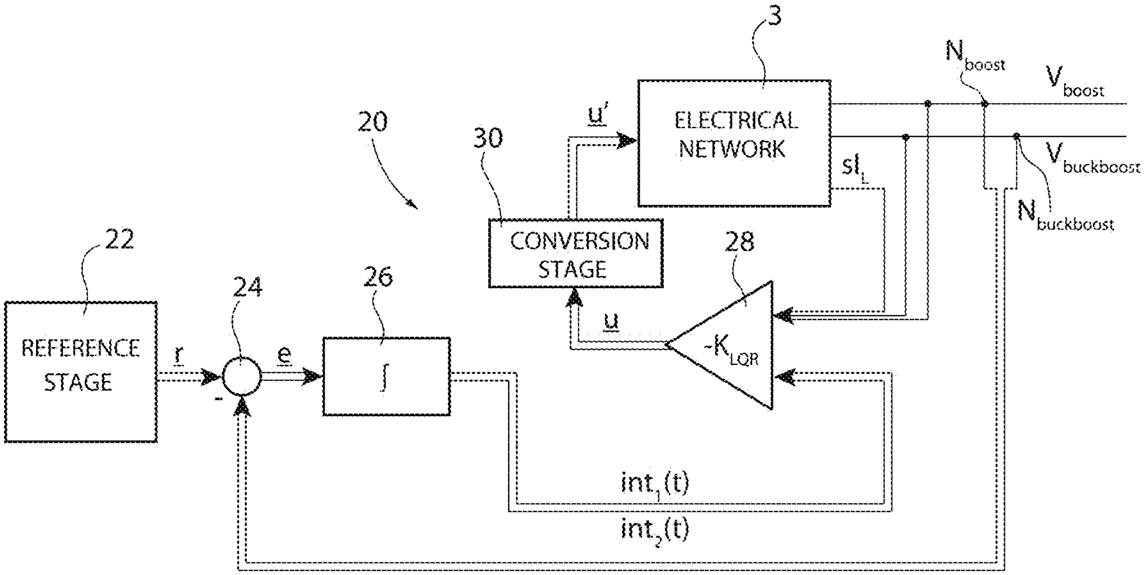
FIGS. 3 and 4 show circuit diagrams of control modules, which are coupled to an electrical network of a DC-DC switching converter.

In more detail, as shown in FIG. 3, the control module 20 comprises a reference stage 22, a subtractor stage 24, an integrator stage 26, a gain stage 28 and a conversion stage 30.

The reference stage 22 generates first and second reference voltages R1, R2, which determine the values of the first and second output voltages $V_{boost}$, $V_{buckboost}$, respectively; in this regard, in FIG. 3 the symbol $\underline{r}$ is used to indicate the set of the first and second reference voltages R1, R2.

The subtractor stage 24 is connected to the first and second output nodes $N_{boost}$, $N_{buckboost}$, so as to receive the first and second output voltages $V_{boost}$, $V_{buckboost}$. Furthermore, the subtractor stage 24 receives the first and second reference voltages R1, R2. The subtractor stage 26 generates first and second error voltages $e_1(t)$, $e_2(t)$, which are respectively equal to the difference between the first reference voltage R1 and the first output voltage $V_{boost}$ and to the difference between the second reference voltage R2 and the second output voltage $V_{buckboost}$. In FIG. 3 the symbol $\underline{e}$ is used to indicate the set of the first and second error voltages $e_1(t)$, $e_2(t)$.

The integrator stage 26 receives the first and second error voltages $e_1(t)$, $e_2(t)$ and generates first and second additional signals $int_1(t)$, $int_2(t)$, which are equal to the integral over time of the first and second error voltages $e_1(t)$, $e_2(t)$, respectively.

The gain stage 28 is connected to the first and second output nodes $N_{boost}$, $N_{buckboost}$, so as to receive the first and second output voltages $V_{boost}$, $V_{buckboost}$. Furthermore, the gain stage 28 is connected to the ammeter 10, so as to receive the signal $sI_L(t)$, and to the integrator stage 26, so as to receive the first and second additional signals $int_1(t)$, $int_2(t)$.

In practice, the triplet composed of the first and second output voltages $V_{boost}$, $V_{buckboost}$ and the signal $sI_L(t)$ is indicative of the state of the switched inductive electrical network 3.

Furthermore, in a per se known manner a so-called DC analysis of the switched inductive electrical network 3 may be carried out, to calculate the nominal values of the quantities $V_{boost}$, $V_{buckboost}$, $I_L$, $D_1$, $D_2$ and $D_3$, relating to the so-called working point of the switched inductive electrical network 3; in other words, the value of the input voltage $V_g$ and the values of the first and second output voltages $V_{boost}$, $V_{buckboost}$ may be imposed, so as to obtain the nominal values of the current $I_L$ and the durations $D_1$, $D_2$ and $D_3$, both in case of continuous-current mode and in case of discontinuous-current mode, in which case the duration $D_4$ is determined as previously described. Furthermore, as regards the state of the switched inductive electrical network 3, it is governed by a set of three non-linear equations, which may be obtained in a per se known manner by implementing the "state-space averaging" technique, i.e., by averaging the equations of state referring to each phase over a switching period. For example, referring for simplicity to the continuous-current mode, for each of the three phases a corresponding set of three equations of state apply, and these three sets of three equations of state are averaged over the switching period; similar considerations apply to the case of discontinuous current, wherein however four sets of three equations of state are present, since the fourth phase is also present.

In this manner, the three equations of state comprise:

$$V'_{boost}=dV_{boost}/dt=f_1(V_{boost},V_{buckboost},I_L,D_1,D_2)$$

$$V'_{buckboost}=dV_{buckboost}/dt=f_2(V_{boost},V_{buckboost},I_L,D_1,D_2)$$

$$I'_L=dI_L/dt=f_3(V_{boost},V_{buckboost},I_L,D_1,D_2)$$

where $f_1$, $f_2$ and $f_3$ represent functions that express the dependencies of the time derivatives of the first and second output voltages $V_{boost}$, $V_{buckboost}$ and the current $I_L$ with respect to the set of five quantities formed by the first and second output voltages $V_{boost}$, $V_{buckboost}$, by the current $I_L$ and the durations $D_1$ and $D_2$. The functions $f_1$, $f_2$ and $f_3$ vary depending on whether the continuous-current mode or the discontinuous-current mode is considered, however the following description does not vary depending on the current mode considered.

By linearizing, by a first-order Taylor approximation, the three above equations around the aforementioned working point of the switched inductive electrical network 3, the following is obtained:

$$x'=A\cdot x+B\cdot u$$

$$y=C\cdot x+D\cdot u$$

where x' expresses the time derivative of x, with $x=[V_{boost},V_{buckboost},sI_L]^T$ (the superscript T indicates the transpose). Furthermore $y=[V_{boost},V_{buckboost}]^T$ and $u=[u_1(t),u_2(t)]^T$, where $u_1(t)$, $u_2(t)$ represent a first and a second control signal, respectively, which are voltage analog signals that control the durations $D_1$ and $D_2$, respectively, such that the durations $D_1$ and $D_2$ are directly proportional, respectively, to the values of the first and second control signals $u_1(t)$, $u_2(t)$, as explained in more detail below. Furthermore, A is a matrix of real numbers having dimensions 3×3, while B is a matrix of real numbers having dimensions 3×2. Additionally, there are the following matrices:

$$C=\begin{bmatrix}1&0&0\\0&1&0\end{bmatrix}$$

$$D=\begin{bmatrix}0&0\\0&0\end{bmatrix}$$

In practice, the matrices A, B, C and D define a time-invariant linear dynamic model of the switched inductive electrical network 3 of the switching converter 1. As previously mentioned, the values of the elements of the matrices A and B vary depending on whether the continuous-current mode or the discontinuous-current mode is considered, however the following description still applies. Furthermore, hereinafter reference is made to the augmented state xaug to indicate the signal vector composed of the first and second output voltages $V_{boost}$, $V_{buckboost}$, the signal $sI_L(t)$ and the first and second additional signals $int_1(t)$, $int_2(t)$; for this reason, there apply the relationships:

$$xaug'=A*\cdot xaug+B*\cdot u$$

$$y=C*\cdot xaug+D*\cdot u$$

where the matrices A*, B*, C* and D* are obtained in a per se known manner from the matrices A, B, C and D. In particular, the matrix A* has dimensions 5×5 and is of the type:

$$\begin{bmatrix}A11&A12&A13&0&0\\A21&A22&A23&0&0\\A31&A32&A33&0&0\\0&0&0&1&0\\0&0&0&0&1\end{bmatrix}$$

where Aij indicates the element on the i-th row and on the j-th column of the matrix A, while the matrix B* has dimensions 5×2 and is of the type:

$$\begin{bmatrix}B11&B12\\B21&B22\\B31&B32\\0&0\\0&0\end{bmatrix}$$

where Bij indicates the element on the i-th row and on the j-th column of the matrix B.

All this having been said, the gain stage 28 is formed, for example, by a corresponding configurable analog electrical network, which implements a so-called Linear-Quadratic Regulator (LQR).

In particular, the gain stage 28 multiplies the augmented state xaug by a state feedback matrix $-K_{LQR}$, which has dimensions 2×5, such that the outcome of the multiplication is equal to the first and second control signals $u_1(t)$, $u_2(t)$. In this regard, in FIG. 3 the symbols $\underline{u}$ and $\underline{u}'$ are used to indicate the set of the first and second control signals $u_1(t)$, $u_2(t)$ and the set of the first and second intermediate signals $u_1'(t)$, $u_2'(t)$, respectively.

In practice, the gain stage 28 implements the operation $u=-K_{LQR}\cdot xaug$. Furthermore, the state feedback matrix $-K_{LQR}$ may be set in a per se known manner, on the basis of a cost function J which depends, in addition to xaug and u, on a first and a second weight matrix Q, R, which have dimensions equal to 5×5 and 2×2, respectively, and may be chosen during the design step; in particular, the augmented state xaug represents an indicator of the performances of the switching converter 1, understood as speed or bandwidth of the control loop, while the vector u represents an indicator of the effort required to the switching converter 1, understood as the use of the inputs (in this case, the first and second control signals $u_1(t)$, $u_2(t)$, i.e. the durations $D_1$, $D_2$).

By choosing the values of the elements of the matrices Q and R, the speed of the control loop may be optimized, without causing saturation of the durations $D_1$, $D_2$, i.e. preventing them from extending for more than one switching period. In fact, the cost function J may be expressed as:

$$J=\int_0^{+\infty}\left(\underline{xaug}^T\cdot Q\cdot\underline{xaug}+\underline{u}^T\cdot R\cdot\underline{u}\right)dt$$

Furthermore, the state feedback matrix $-K_{LQR}$ is obtained in a per se known manner by minimizing the cost function J and is a function of the matrices A*, B*, Q and R. In this manner, the durations $D_1$, $D_2$ are controlled efficiently, with a control loop that is fast and which does not need the presence of high-frequency timing signals.

The conversion stage 30 receives the first and second control signals $u_1(t)$, $u_2(t)$, on the basis of which it generates the first and second intermediate signals $u_1'(t)$, $u_2'(t)$, respectively, such that the first and second intermediate signals $u_1'(t)$, $u_2'(t)$ are binary-type voltage signals, with duty cycles that are directly proportional to the voltage values of the first and second control signals $u_1(t)$, $u_2(t)$, respectively. In other words, the conversion stage 30 carries out a voltage-duration conversion, of a per se known type. In this manner, as previously mentioned, the driving stage 14 may then generate the first, second, third, fourth and fifth switch control signals $sS_1$, $sS_2$, $sS_3$, $sS_4$, $sS_5$ so as to implement the phase succession shown in FIG. 2A or in FIG. 2B (depending on whether the continuous-current mode or the discontinuous-current mode is being used), where the durations $D_1$ and $D_2$ are a function of the first and second control signals $u_1(t)$, $u_2(t)$, respectively, and are optimized thanks to the linear-quadratic regulator implemented by the gain stage 28.

The previously described operation of the switching converter 1 is independent of the relationship between the input voltage $V_g$ and the first and second output voltages $V_{boost}$, $V_{buckboost}$. In particular, the second output voltage $V_{buckboost}$ may be lower than the input voltage $V_g$, as previously described, or it may be higher than the input voltage $V_g$, in which case the switching converter 1 operates as a boost-boost converter; in the latter case, the first, second and fourth phases are the same as previously described, while the third phase provides for the first and fourth switches $sS_1$, $sS_4$ being closed and the second, third and fifth switches $sS_2$, $sS_3$, $sS_5$ being open.

Figure 4:
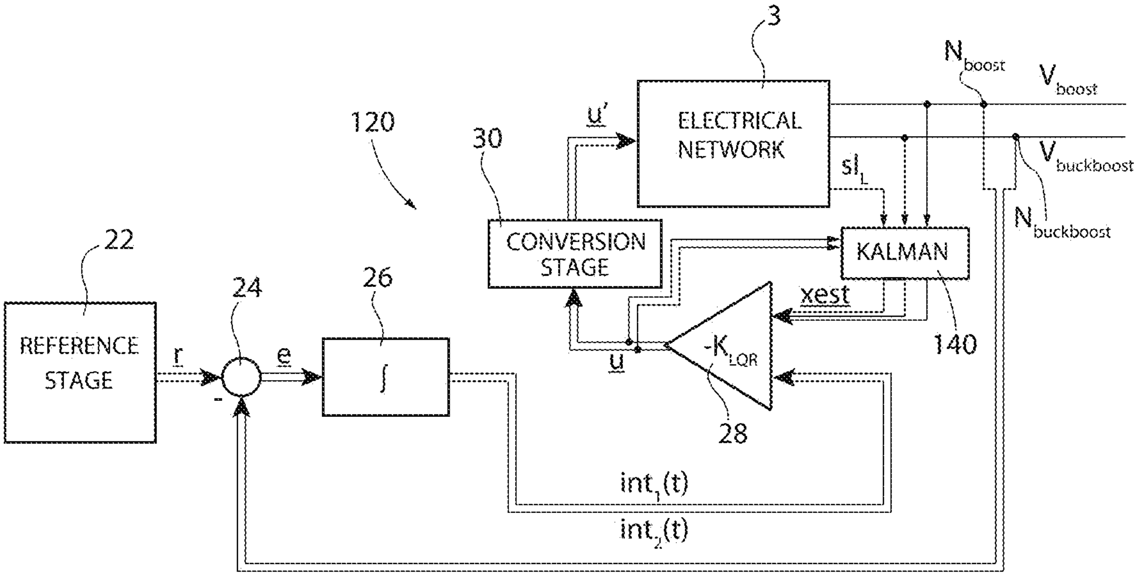

According to a different embodiment, shown in FIG. 4, the control module, indicated by 120, comprises a filtering stage 140, which is connected to the switched inductive electrical network 3 so as to receive the first and second output voltages $V_{boost}$, $V_{buckboost}$, and is further connected to the output of the gain stage 28, so as to receive the first and second control signals $u_1(t)$, $u_2(t)$.

In more detail, the ammeter 10 is absent. Furthermore, the filtering stage 140 functions as a state observer and implements a Kalman filter, so as to generate at output a vector xest, which includes the triplet of signals made by the first and second output voltages $V_{boost}$, $V_{buckboost}$ and by a current estimation signal $sI_{Lest}$, which represents an estimate of the current $I_L$, which is generated by the Kalman filter on the basis of the first and second output voltages $V_{boost}$, $V_{buckboost}$ and the first and second control signals $u_1(t)$, $u_2(t)$.

In practice, $xest=[V_{boost}, V_{buckboost}, sI_{Lest}]^T$. Furthermore, the augmented state xaug is formed by the vector xest and the first and second additional signals $int_1(t)$, $int_2(t)$; the operation of the gain module 28 remains the same as previously described.

The embodiment shown in FIG. 4 functions like the embodiment shown in FIG. 3, but disregards the actual accessibility to the current $I_L$. The current $I_L$ is in fact estimated by the filtering stage 140, rather than detected by the ammeter 10.

The advantages that the present solution affords are clear from the preceding description. In particular, the control module implements a single control loop of the durations $D_1$, $D_2$ of time-continuous and analog-type, which has high speed and does not require a high-frequency timing signal, to the benefit of constructive simplicity, stability and consumption reduction.

Furthermore, the fact that the gain stage 28 operates starting from the augmented state of the switched inductive electrical network 3, which also includes the first and second additional signals $int_1(t)$, $int_2(t)$, allows a zero error to be imposed, in steady-state, i.e. it allows the differences between the first and second output voltages $V_{boost}$, $V_{buckboost}$ and, the first and second reference voltages R1, R2, respectively, to be cancelled out.

Figure 5:
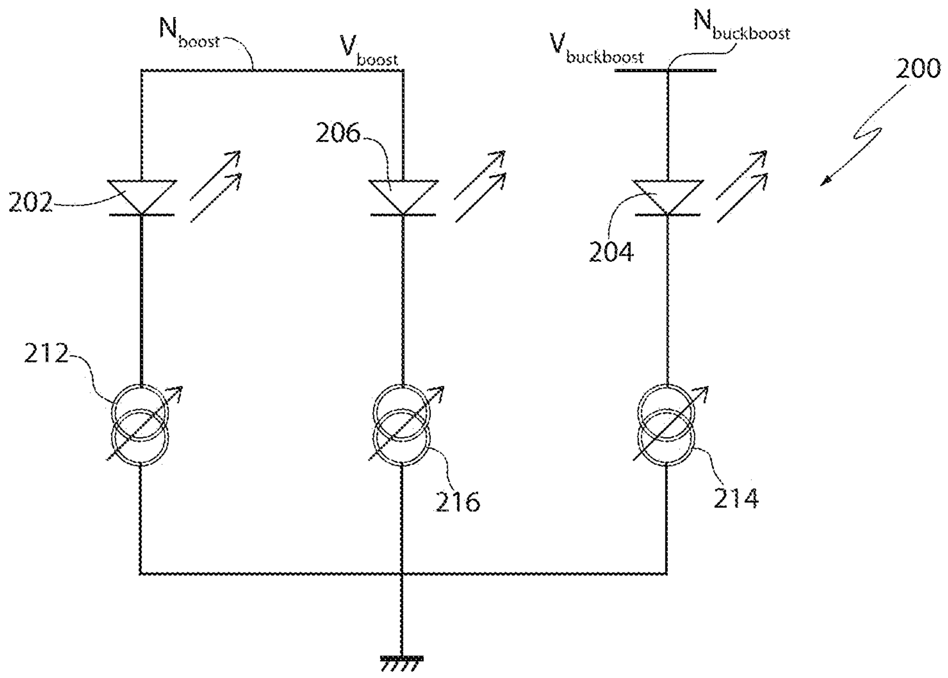
FIG. 5 shows a circuit diagram of a radiation emission system.

The above advantages make the switching converter 1 particularly suitable for use in the optical source driving field, as shown for example in FIG. 5, wherein an electronic system 200 is shown.

In detail, the electronic system 200 is coupled to the first and second output nodes $N_{boost}$, $N_{buckboost}$, so as to receive the first and second output voltages $V_{boost}$, $V_{buckboost}$.

Furthermore, the electronic system 200 comprises first, second and third light emitting diodes 202, 204, 206, which are for example LASER diodes and emit in green, red and blue, respectively. Furthermore, the electronic system 200 comprises first, second and third current regulators 212, 214, 216.

In particular, the anode and cathode of the first light diode 202 are connected, respectively, to the first output node $N_{boost}$ and to a first terminal of the first current regulator 212, whose second terminal is connected to ground.

The anode and cathode of the second light diode 204 are connected, respectively, to the second output node $N_{buckboost}$ and to a first terminal of the second current regulator 214, whose second terminal is connected to ground.

The anode and cathode of the third light diode 206 are connected, respectively, to the first output node $N_{boost}$ and to a first terminal of the third current regulator 216, whose second terminal is connected to ground.

In practice, the first, second and third current regulators 212, 214, 216 are formed by corresponding digital-analog regulators controllable so as to impose the currents which flow into the first, second and third light diodes 202, 204, 206, respectively, in order to control the intensities of the radiation emitted. Furthermore, the second light diode 204 is subject to a voltage which depends on the second output voltage $V_{buckboost}$; and the first and third light diodes 202, 206 are subject to voltages which depend on the first output voltage $V_{boost}$.

Finally, it is clear that modifications and variations may be made to the control module previously described, without departing from the scope of the present invention, as defined in the attached claims.

For example, as previously mentioned, the phases and/or the order of the phases during each switching period may differ from what has been described.

The first and/or the second additional signals $int_1(t)$, $int_2(t)$ may be absent, in which case the augmented state xaug modifies accordingly.

If the Kalman filter is present, the vector xest may include, in addition to the current estimation signal $sI_{Les}t$, estimation signals of the first and second output voltages $V_{boost}$, $V_{buckboost}$, in which case the gain stage 28 may still operate on the augmented state $xaug=[V_{boost}, V_{buckboost}, sI_{Lest}, int_1(t), int_2(t)]^T$, which may therefore only include part of the vector xest.

In general, the composition of the augmented state xaug may vary from what has been described, for example by inclusion of further error integration signals.

The switching converter may also be of the single-inductor type, with a number of outputs NOUT greater than two. In this case, the state feedback matrix $-K_{LQR}$ has dimensions equal to NPH×(1+2·NOUT), where NPH is equal to the number of independent phases; furthermore, the augmented state may comprise, in addition to the current $I_L$, a number of voltages equal to NOUT and a number of error integration signals equal to NOUT.

The invention claimed is:

1. A control module for a DC-DC switching converter, where said DC-DC switching converter comprises an electrical network configured to couple to a source generator and including an inductor, a plurality of electronically controllable switches and first and second output capacitors, which, in use, are subject to first and second output voltages, respectively, wherein said control module is configured to generate first and second control signals to control the electronically controllable switches so as to implement a sequence of switching periods and to implement, for each switching period, a phase succession;

wherein the phase succession comprises:

a charge phase of the inductor, wherein the inductor is coupled to the source generator and a current flowing through the inductor increases over time, said charge phase of the inductor having a first duration which is a function of the first control signal;

a first discharge phase of the inductor, wherein the inductor is coupled to the first output capacitor such that the current discharges towards the first output capacitor, said first discharge phase of the inductor having a second duration which is a function of the second control signal; and a second discharge phase of the inductor, wherein the inductor is coupled to the second output capacitor such that the current discharges towards the second output capacitor;

wherein the control module is further configured to couple to the electrical network so as to form a signal vector including at least first, second and third input signals which are indicative respectively of the first and second output voltages and of said current;

wherein the control module further comprises a gain stage configured to generate the first and second control signals by multiplying the signal vector by a gain matrix, the gain matrix being such that the control module forms a linear-quadratic regulator.

2. The control module according to claim 1, further comprising an integrator stage configured to generate first and second additional signals respectively indicative of integrals over time of first and second error signals indicative respectively of a difference between the first output voltage and a first reference voltage and a difference between the second output voltage and a second reference voltage; and wherein the signal vector further comprises the first and second additional signals.

3. The control module according to claim 1, further comprising a detector configured to generate a current detection signal indicative of said current; and wherein the first and second input signals are formed by the first and second output voltages, respectively; and wherein the third input signal is formed by the current detection signal.

4. The control module according to claim 1, further comprising a Kalman filter configured to generate an estimate vector on the basis of the first and second output voltages and the first and second control signals, the estimate vector comprising the third input signal; and wherein the first and second input signals are formed by the first and second output voltages, respectively.

5. The control module according to claim 1, wherein the gain matrix is obtained by minimizing a cost function relating to a time-invariant linear dynamic system that models the electrical network.

6. The control module according to claim 1, wherein said plurality of electronically controllable switches comprises:

a first switch configured to be electrically interposed between the source generator and a first terminal of the inductor;

a second switch electrically connected between the first terminal of the inductor and a node at a reference potential;

a third switch electrically connected between a second terminal of the inductor and the node at the reference potential;

a fourth switch electrically connected between the second terminal of the inductor and the second output capacitor; and a fifth switch electrically connected between the second terminal of the inductor and the first output capacitor.

7. A DC-DC switching converter, comprising:

the control module according to claim 1; and said electrical network.

8. A system, comprising:

the DC-DC switching converter according to claim 7;

first and second light diodes configured to emit light radiation at different wavelengths and electrically coupled, respectively, to the first and second output capacitors; and first and second current regulators which are controllable so as to regulate the currents that flow in the first and second light diodes, respectively.

9. A method for controlling a DC-DC switching converter;

wherein said DC-DC switching converter comprises an electrical network configured to couple to a source generator and including an inductor, a plurality of electronically controllable switches and first and second output capacitors, which, in use, are subject to first and second output voltages, respectively;

said method comprising:

generating first and second control signals for controlling the electronically controllable switches so as to implement a sequence of switching periods; and implementing, for each switching period, a phase succession which comprises:

a charge phase of the inductor, wherein the inductor is coupled to the source generator and a current, which increases over time, flows through the inductor, said charge phase of the inductor having a first duration which is a function of the first control signal;

a first discharge phase of the inductor, wherein the inductor is coupled to the first output capacitor such that the current discharges towards the first output capacitor, said first discharge phase of the inductor having a second duration which is a function of the second control signal; and a second discharge phase of the inductor, wherein the inductor is coupled to the second output capacitor such that the current discharges towards the second output capacitor;

forming a signal vector including at least first, second and third input signals which are indicative respectively of the first and second output voltages and of said current; and generating the first and second control signals by multiplying the signal vector by a gain matrix, the gain matrix being such that the control module forms a linear-quadratic regulator.

10. The control method according to claim 9, further comprising generating first and second additional signals which are respectively indicative of integrals over time of first and second error signals which are indicative respectively of a difference between the first output voltage and a first reference voltage and a difference between the second output voltage and a second reference voltage; and wherein the signal vector further comprises the first and second additional signals.

11. The control method according to claim 9, further comprising generating a current detection signal which is indicative of said current; wherein the first and second input signals are formed by the first and second output voltages, respectively; and wherein the third input signal is formed by the current detection signal.

12. The control method according to claim 9, further comprising performing a Kalman filtering to generate an estimate vector on the basis of the first and second output voltages and of the first and second control signals, the estimate vector comprising the third input signal; and wherein the first and second input signals are formed by the first and second output voltages, respectively.

13. The control method according to claim 9, further comprising minimizing a cost function relating to a time-invariant linear dynamic system that models the electrical network to generate the gain matrix.

* * * * *